United States Patent [19]
Honda et al.

[11] Patent Number: 4,856,330
[45] Date of Patent: Aug. 15, 1989

[54] FLUID SPEED OR DIRECTION MEASURING APPARATUS

[75] Inventors: Hideyuki Honda, Kyoto; Koichi Kawasaki, Tokyo; Hiroshi Sato, Machida, all of Japan

[73] Assignees: Honda Engineering Co., Ltd., Osaka; Tokyo Denshi Yakin Co., Ltd., Kanagawa, both of Japan

[21] Appl. No.: 39,198

[22] Filed: Apr. 16, 1987

[30] Foreign Application Priority Data

| Apr. 17, 1986 | [JP] | Japan | 61-57682[U] |
| Apr. 17, 1986 | [JP] | Japan | 61-57683[U] |
| Sep. 12, 1986 | [JP] | Japan | 61-140965[U] |
| Sep. 12, 1986 | [JP] | Japan | 61-140964[U] |
| Sep. 24, 1986 | [JP] | Japan | 61-22562 |

[51] Int. Cl.⁴ .............................................. G01F 1/68
[52] U.S. Cl. ................................. 73/204.25; 73/189
[58] Field of Search ............... 73/189, 204, 204.23, 73/204.24; 357/28

[56] References Cited

U.S. PATENT DOCUMENTS

| 3,298,229 | 1/1967 | Klein | 357/28 X |
| 3,310,502 | 3/1967 | Komatsubara et al. | 357/28 X |
| 3,343,114 | 9/1967 | Rice | 357/28 X |
| 3,592,055 | 7/1971 | Dorman | 73/204 X |
| 3,604,261 | 9/1971 | Olin | 73/189 |
| 4,300,391 | 11/1981 | Eiermann | 73/204 |
| 4,319,483 | 3/1982 | Durham et al. | 73/204 |
| 4,393,697 | 7/1983 | Sato et al. | 73/204 X |

FOREIGN PATENT DOCUMENTS

61-84563  4/1986  Japan .

*Primary Examiner*—Herbert Goldstein
*Attorney, Agent, or Firm*—Armstrong, Nikaido Marmelstein Kubovcik & Murray

[57] ABSTRACT

A fluid speed or direction measuring apparatus utilizes a sensor where an output changes regularly with respect to a temperature change at the resistance-temperature characteristic of a piece of single crystal germanium, thereby converting the temperature change in the single crystal germanium in contact with the fluid into a resistance change, so that the resistance change is converted into voltage, a current or electric power.

38 Claims, 17 Drawing Sheets

FIG.8
FIG.9
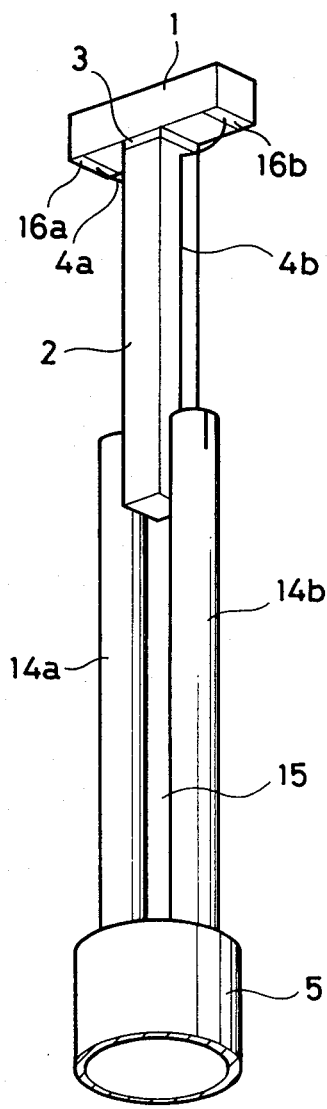
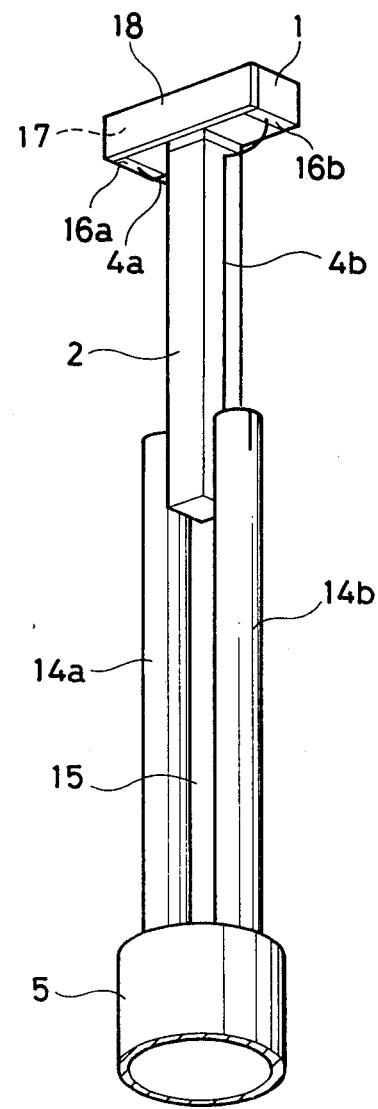

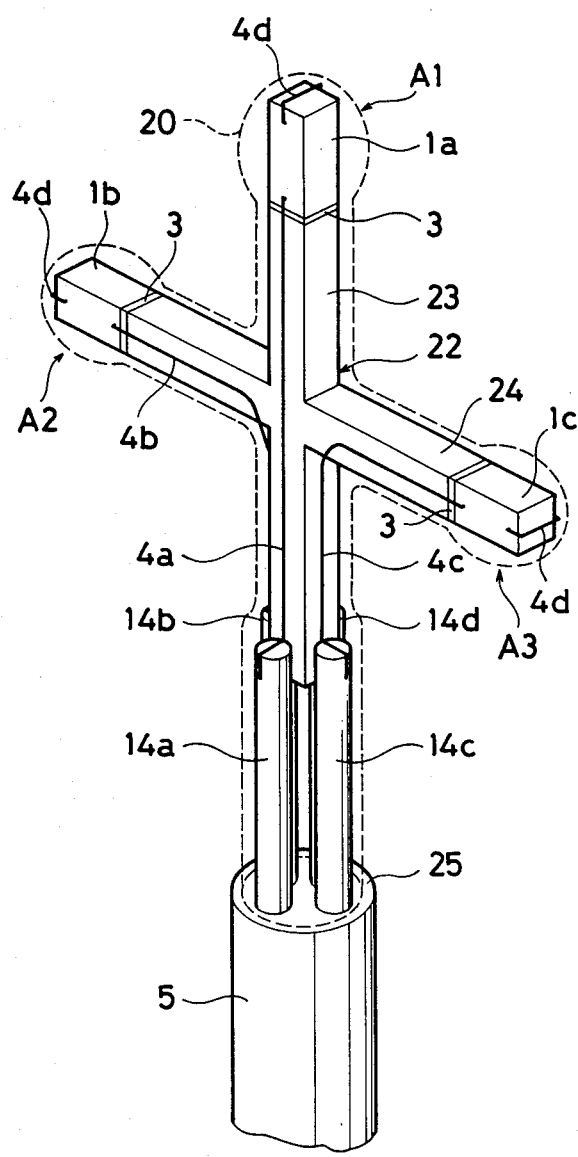
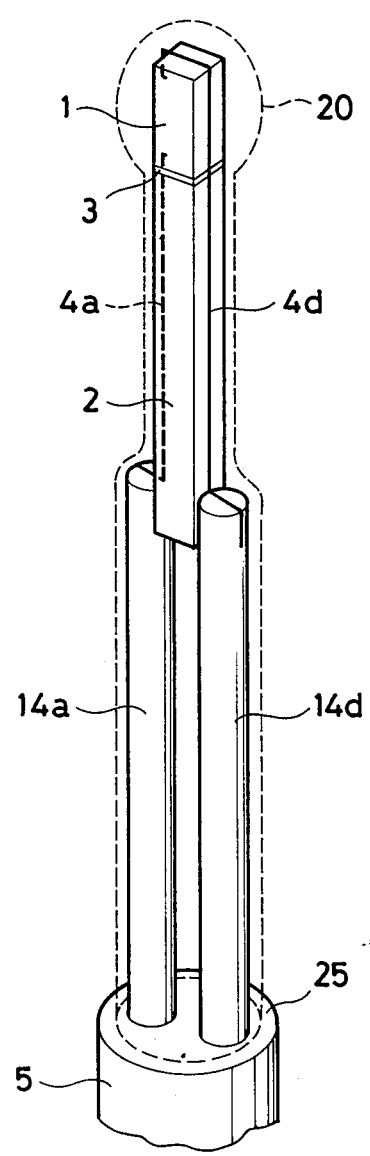
FIG.19
FIG.20

FLUID SPEED OR DIRECTION MEASURING APPARATUS

BACKGROUND OF THE INVENTION

1. Field of the Invention

The present invention relates to a measuring apparatus for the speed or direction of fluid, such as air or liquid.

2. Description of the Prior Art

There are at present many types of hot anemometers for measuring the fluid speed.

The hot anemometer is formed of coiled tungsten or platinum wire to which voltage is applied so as to raise a temperature up to a predetermined degree, and comprises bridge circuits to keep constant the temperature of a sensor, thereby measuring the wind speed by the hot ray on a basis of change in voltage, current or power, following a resistance change in the sensor caused by a speed change of the fluid.

Such hot anemometer, however, is likely to disconnect its coil, is problematical in handling or its lifetime, and causes variation in the characteristic of each sensor, whereby it is required to correct an output value to meet the characteristic of each sensor and to provide an amplifier at each sensor for the multipoint measurement.

Also, it is necessary for improving the measuring accuracy to largely amplify by an amplifier a resistance value smaller in a range of change, whereby the anemometer is defective in that it is very expensive for amplification and complex in supporting a coiled hot wire and holding lead wires connected thereto.

SUMMARY OF THE INVENTION

An object of the invention is to provide a fluid speed or direction measuring apparatus which uses a sensor of germanium single crystal to increase physical and mechanical strength, facilitate handling, enable multipoint measurement by a single amplifier, and support the sensor to hold the lead wire therefor with ease, thereby enabling the fluid speed to be measured regardless of the fluid direction, and the fluid direction and speed to be measured solely or simultaneously for the last purpose.

These and other objects and features of the invention will become more apparent upon a reading of the following detailed specification and drawings.

BRIEF DESCRIPTION OF THE DRAWINGS

FIG. 8 is a perspective view explanatory of a third embodiment of the fluid speed or direction measuring apparatus of the invention, FIG. 9 is a perspective view explanatory of a fourth embodiment of the fluid speed or direction measuring apparatus of the invention, FIG. 19 is a perspective view explanatory of a seventh embodiment of the fluid speed or direction measuring apparatus of the invention, FIG. 20 is a perspective view explanatory of a simple substance probe used for the experiment of the seventh embodiment.

DETAILED DESCRIPTION OF THE INVENTION

A sensor used in the embodiment of the fluid speed or direction measuring apparatus of the invention utilizes the region where resistance changes at a constant inclination with respect to the temperature in the specific resistance temperature characteristic of germanium.

The embodiments of the measuring apparatus of the invention using the above-mentioned sensor will be described in accordance with the drawings.

First Embodiment

Figure 1:
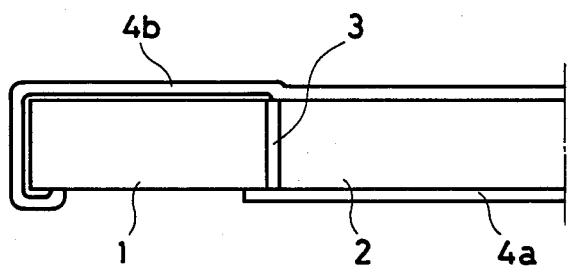
FIGS. 1 and 2 are illustrations of a first embodiment of a fluid speed or direction measuring apparatus of the invention.
Figure 2:
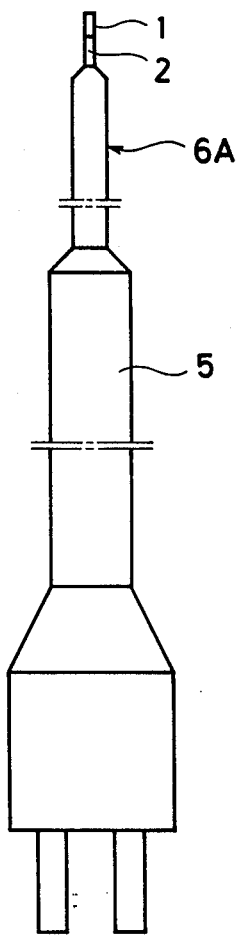

FIGS. 1 and 2 are illustrations of a first embodiment of a fluid speed or direction measuring apparatus of the invention, in which reference numeral 1 designates a rectangular parallelepiped sensor of germanium single crystal, to one lengthwise end of which a rod-like shaped support 2 formed of inorganic material, such as glass or ceramics, or synthetic resin, is fixed with an adhesive layer 3.

The sensor 1, however, is not defined to its form in the first embodiment, but may be rod-like-shaped, band-like-shaped, cubic, spherical, etc.

The support 2 is an electrical insulator and employs a material superior in adiabatic property. For example, an inorganic material, such as ceramics or glass, or synthetic resin, is used for the support 2.

Reference numerals 4a and 4b designate lead wires formed of metal, such as gold, of small electric resistance and fixed in vacuum evaporation or the like on both lengthwise ends at one side surface of the sensor 1, the lead wires 4a and 4b being extended along the side surfaces of support 2.

Such sensor 1 and support 2, as shown in FIG. 2, are fixed onto a proper support base 5 to form a probe 6A which is disposed in a wind channel.

Figure 3:
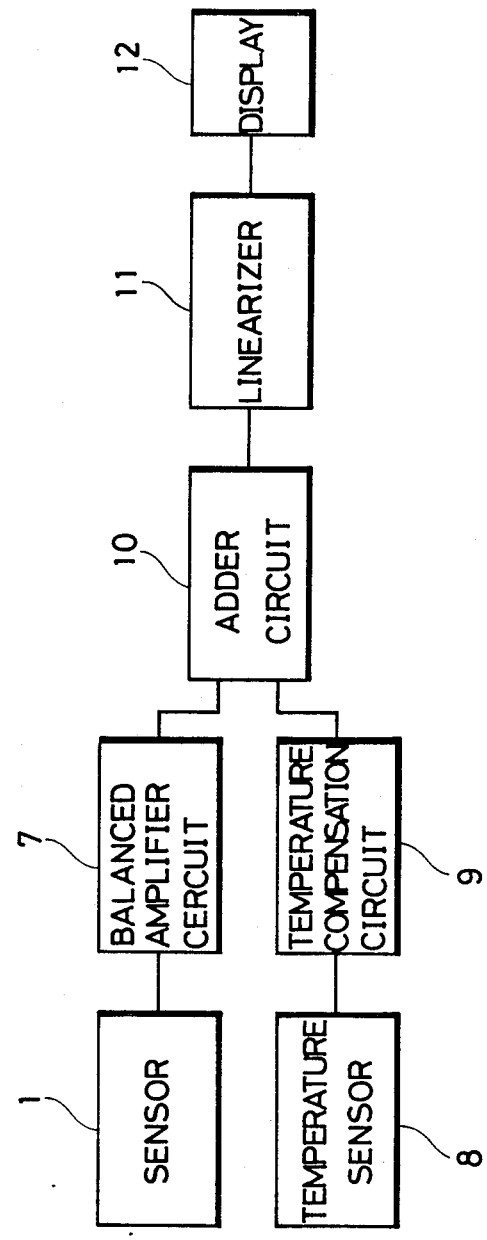
FIG. 3 is a block diagram of a measuring circuit used for the first embodiment of the invention.

In order to measure the fluid speed by use of the probe 6A, a measuring circuit shown in a block diagram in FIG. 3 is used.

In FIG. 3, reference numeral 7 designates a balanced amplifier circuit, which is connected to the lead wires 4a and 4b at the probe 6A so as to apply voltage to the sensor 1, raise the temperature thereof to maintain it at a constant temperature and amplify a current or the like following a change in electric resistance of the sensor 1.

The balanced amplifier circuit 7 may use an amplifier which supplies a predetermined current to the sensor 1 to amplify voltage changing following a temperature change in the sensor 1, or reads as a current value or voltage value a change in additional power required to keep the sensor at the predetermined temperature and amplifies the value.

Reference numeral 8 designates a temperature sensor to display the temperature change as a variation value of voltage, current or power, which sensor 8 is connected to a temperature compensation circuit 9.

The current changed following a temperature change in the sensor 1 or 8 is displayed as the wind speed in an indicator 12 through an adder circuit and a linearizer 11.

Figure 4:
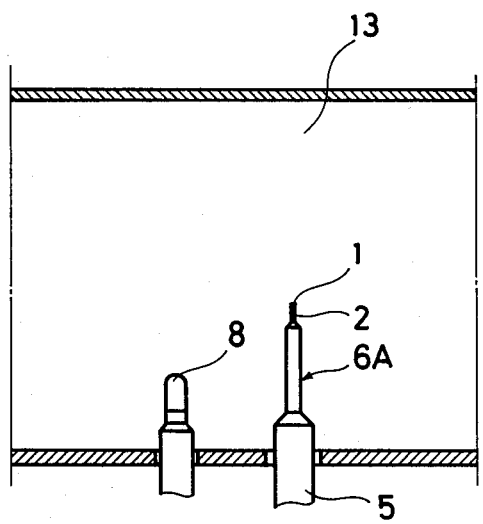
FIG. 4 is an illustration of the first embodiment when disposed together with a temperature sensor in a wind channel.

The above apparatus is used in an experiment in a wind channel 13 in such a manner that, as shown in FIG. 4, the probe 6A and temperature sensor 8 are set in the wind channel 13, a predetermined voltage is applied from the balanced amplifier circuit 7 to the sensor 1, and the sensor 1 is raised up to a predetermined temperature and kept thereat.

Upon changing the fluid speed in the wind channel 13, heat exchange is created between the fluid and the sensor 1 corresponding to the speed change, so that as the temperature of sensor 1 changes its electric resistance changes.

A current variation corresponding to variation in electric resistance is amplified by the amplifier circuit 7 to thereby display the fluid speed in the indicator 12 on the basis of the amplified value through the adder circuit 10 and linearizer 11.

In a case where the multipoint measurement is carried out, the current, voltage or power of the sensor 1 need only be amplified of its change through a scanner, thereby enabling the data process of a plurality of sensors 1 by one amplifier circuit.

In addition, it is possible to remove the temperature sensor 8 and resistance inserted in series in the sensor 1 is switched so that the sensor 1 is used as both the temperature sensor and fluid speed measuring sensor.

The apparatus, as above-mentioned, employs germanium single crystal as the sensor 1 and germanium is larger in variation in electric resistance varying corresponding to the temperature change following the fluid speed, thereby enabling the fluid speed to be measured exactly and with high accuracy.

Since a small piece of germanium single crystal is used as the sensor 1, the sensor 1 is larger in a surface area than the hot wire. Hence, even when dust or the like is attached onto the surface of sensor 1, an effect by the dust onto the entire sensor 1 is negligible, thereby enabling the fluid speed to be measured in an optimum environment. Also, the sensor 1 scarcely has a fear of damage such as disconnection like the hot wire, is easy to handle, need not be largely amplified due to high output voltage, and is less affected by noises from the amplifier or the like.

Also, germanium of single crystal is obtainable of high purity and easy to obtain elements of the same characteristic, whereby, when multipoint-measured, data of each sensor can be processed by the same balanced amplifier circuit.

Furthermore, also for supporting the sensor 1, composed of a small piece of germanium not to be deformed, the rod-like-shaped support 2 can be fixed directly to the side surface of the sensor 1 and thus the support 2 is support enough. Hence, the sensor 1 can easily and rigidly be supported so as to be usable stably even in a liquid or particles as well as in air.

Second Embodiment

Figure 5:
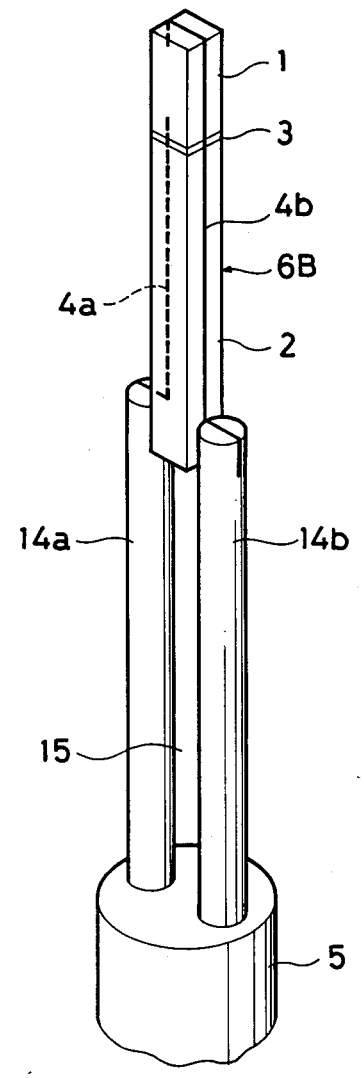
FIG. 5 is a perspective view explanatory of a second embodiment of the fluid speed or direction measuring apparatus of the invention.

FIG. 5 is a perspective view explanatory of a probe 6B for a second embodiment of the fluid speed or direction measuring apparatus of the invention.

The probe 6B at the second embodiment is constructed to have an extremely reduced the size of junction between the support 2 and the support base 5 so as to improve the measurement accuracy by preventing as much as possible the heat conduction from the sensor 1 to the support base 5 through the support 2. On the support base 5 are erected two metallic poles 14a and 14b each of an about tubular shape so that the support 2 shown in the first embodiment is fixed between the poles 14a and 14b in such a manner that the support 2 is positioned between the support poles 14a and 14b at the side surfaces thereof and somewhat below the upper ends of poles 14a and 14b, thereby forming a space 15 between the upper surface of the support base 5 and the end surface of the support 2 and bonding or soldering the support 2 to the poles 14a and 14b by use of an electrically conductive adhesive.

It is preferable from the viewpoint of the measuring error, kinds of fluid and deterioration with the lapse of time, to use a good electrical conductor, less corrosive, such as stainless steel, for the support poles 14a and 14b.

The measuring accuracy of the probe 6B at the second embodiment will be proved by the experiment.

The probe 6B at the second embodiment constructed as follows are used to carry out the wind channel experiment.

The sensor 1 is formed of germanium single crystal and shaped in an about rectangular parallelepiped of 0.3×0.3×1 mm, the support 2 is 5 mm in length, the support poles 14a and 14b are each 0.5 mm in diameter and 6.5 mm in length, and the balanced amplifier circuit 7 in the first embodiment is used in the external condition in two cases of the wind speed of 2 to 10 m/sec and of the sensor temperatures of 140° C. and 160° C., thereby having measured terminal voltage of the sensor 1 as output voltage.

Figure 6:
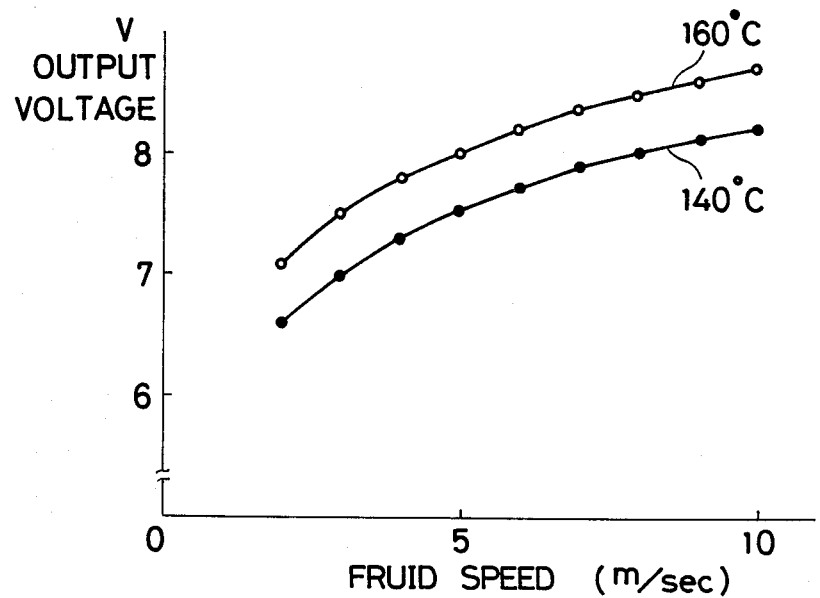
FIG. 6 is a characteristic view of the fluid speed to the output voltage in the experiment in the wind channel by use of the second embodiment of the fluid speed or direction measuring apparatus of the invention.

FIG. 6 is a graph of the results of experiment on the basis of the above condition, which is plotted by taking output voltage V on the axis of ordinate and the wind speed U on the axis of abscissa.

It has been clarified from the above experimental results that the outputs of the sensor 1 at the temperature of 140° C. and 160° C. are in relation of substantially moving in parallel, the fluid speed is plotted on the high order polynomial expression by which the fluid speed is theoretically computed, and the heat of sensor 1 is conducted to the support base 5 through the support 2, thereby lowering the temperature of the sensor 1 and reducing an error caused during the measurement.

Next, the relation between the heat transfer of the probe 6B at the second embodiment and the wind speed has been obtained from the following experiment.

A temperature Tw of the sensor 1 is measured at the temperature 154° C. and that Ta of the fluid is measured at four points: 29.6° C., 40.3° C., 50.2° C. and 60.0° C., to change the fluid speed into 2 to 10 m/sec, and the heat transfer characteristic of the fluid to the sensor is represented by a function $Qw/(Tw-Ta)=A+BU^m$ (U: fluid speed and Qw: heat quantity flowing per 1 sec) so as to obtain the exponent m linearly changing at the left side by a computer, then it has been clear that the left side is plotted on a straight line when the exponent m=0.4.

Figure 7:
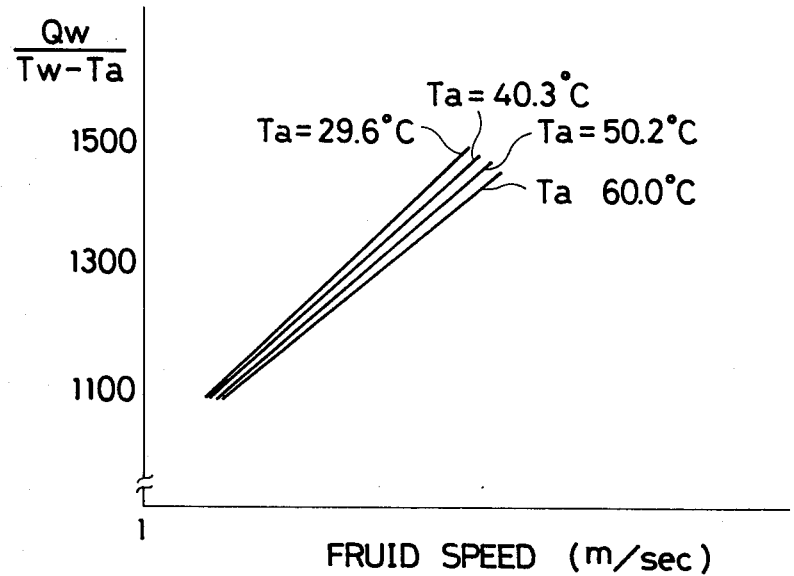
FIG. 7 is a characteristic view of heat transfer at the second embodiment.

FIG. 7 is a graph showing the above heat transfer characteristic, in which $Qw/(Tw-Ta)$ is taken on the axis of ordinate and the fluid speed U on the axis of abscissa.

In addition, A and B are the constants not to change by the temperature. Accordingly, it has been found that the temperature compensation is extremely easy when carried out on the basis of the function of m=0.4.

In summary of the experimental results, since the junction of the support poles 14a and 14b and the support 2 is extremely reduced in the size, the heat of sensor 1 is less escaped to the support poles 14a and 14b through the support 2. Since the fluid passes through the space 15, thereby preventing a measuring error from being caused by the fluid guided by the support 2 to the sensor 1.

Also, since the heat transfer characteristic is plotted on the constant function, the temperature compensation is extremely easy to perform.

However, although the measurement accuracy somewhat lowers, the function of the support 2 and support poles 14a and 14b may of course be made larger to reduce the space 15 between the support 2 and the support base 5 so as to stably fix the support 2.

Third Embodiment

FIG. 8 is a perspective view explanatory of a third embodiment of the fluid speed or direction measuring apparatus of the invention, in which the sensor 1 is bonded at the center portion of the longitudinal side surface thereof to the upper end face of support 2 and fixed thereto in a substantially T-like shape, so that metal pieces of high electrical conductivity, such as gold, silver, copper or platinum, are fixed onto both side edges of the bonded surface, the metal pieces being formed in the electrodes 16a and 16b respectively.

Lead wires 4a and 4b are drawn out from the electrodes 16a and 16b and connected to the support poles 14a and 14b respectively.

Such construction enables the fluid speed to be measured at any angle because the sensor 1 faces extremely at most outer surfaces.

Also, since the sensor 1 is fixed at the lengthwise central portion thereof onto the upper end of support 2 and divided into two by the support 2, variations in resistance values at both ends of sensor 1 are eliminated, thereby enabling the measurement error to be reduced.

Fourth Embodiment

FIG. 9 is a perspective view explanatory of a fourth embodiment of the invention, which aims at measurement of the fluid speed and direction as the same as the first through third embodiments of the invention. The fourth embodiment is so constructed that the sensor 1 is formed as the same as the measuring probe at the third embodiment and a layer 18 of electrically insulating synthetic resin is provided at one side surface 17 adjacent to the surface through which the sensor 1 is fixed to the support 2, the synthetic resin layer 18 being utilized to change the output voltage of sensor 1 due to the direction of the fluid.

In addition, the synthetic resin layer 18 employs epoxy resin, silicon resin, aniline resin, phenol resin, polyester resin, or urethane resin, and besides this, an inorganic substance, such as glass or ceramics is available. Also, the synthetic resin layer 18 may be triangular or semicircular in section.

In order to measure the direction of the fluid by use of the fluid speed or direction measuring apparatus of the third embodiment, the following experiment has been carried out.

The probe in use comprises a sensor 1 of germanium single crystal formed in a substantial rectangular parallelepiped of 0.6×0.6×4 mm, a support 2 of 5 mm in length, support poles 14a and 14b each of 0.5 mm in diameter and 6.5 mm in length, and a synthetic resin layer 18 of epoxy resin.

Figure 10:
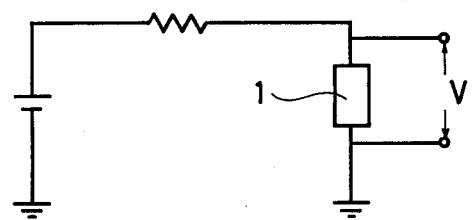
FIG. 10 is a circuit diagram of series resistance used in the fourth embodiment.
Figure 11:
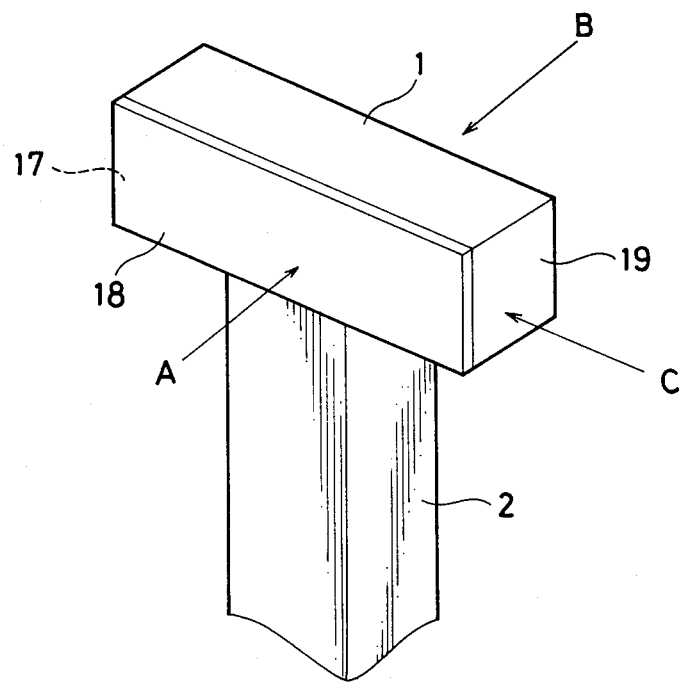
FIG. 11 is an enlarged view explanatory of the flowing direction of the fluid.
Figure 12:
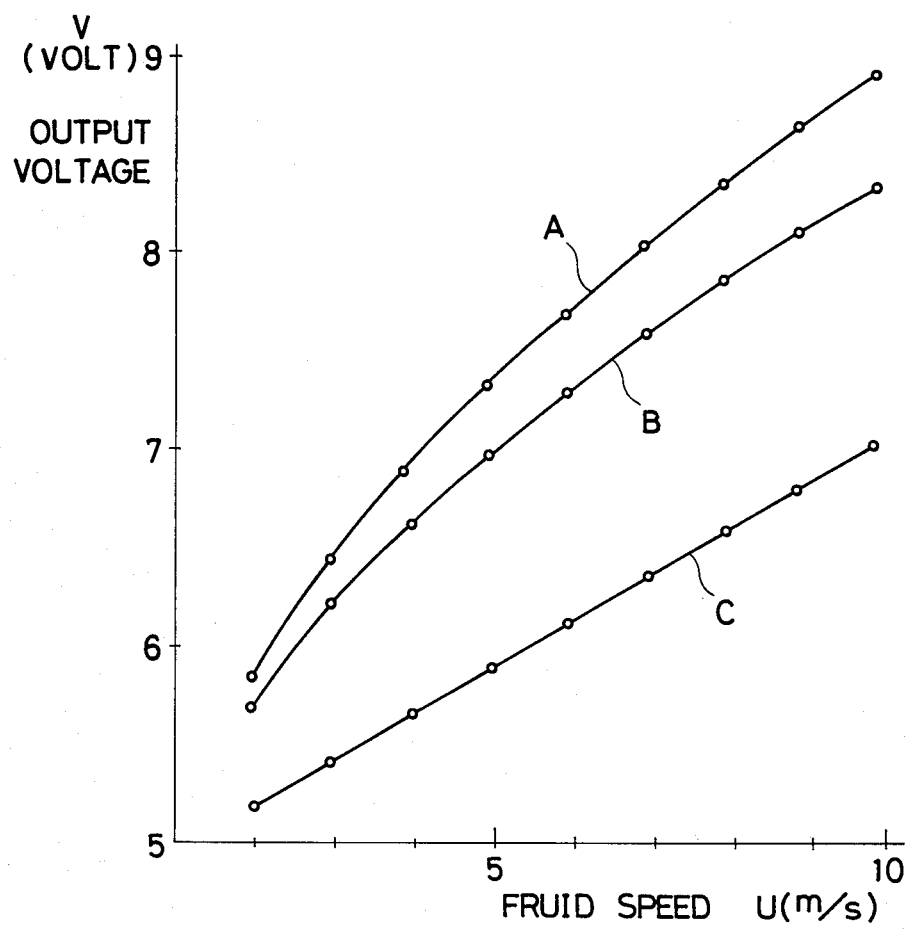
FIG. 12 is a characteristic view of the fluid speed to the output voltage shown by an angle between the flowing direction of the fluid and the fourth embodiment of the fluid speed or direction measuring apparatus.

A series resistance circuit, which applies supply voltage of 30 V to the sensor 1 through a resistance of 400Ω as shown in FIG. 10, is used to change the fluid speed into 1 to 10 m/sec under the predetermined condition of the fluid temperature of 21° C., thereby plotting terminal voltage of the sensor 1 on a graph as shown in FIG. 12, where, as shown in FIG. 11, a case where the fluid comes perpendicularly to the synthetic resin layer 18 of sensor 1 is represented by A and a case where the same comes perpendicularly to the surface of sensor 1 opposite to the synthetic resin layer 18 is represented by B and a case where the same comes perpendicularly to the end face 19 is represented by C as shown in FIG. 11.

The characteristic view of FIG. 12 means that the output C is the smallest and the output A is larger than that B, whereby the case A is cooler than that B.

It is deemed that the factor of the above is that the sensor 1 is affected by the fluid striking the opposite surface in a eddy flow more than by the same directly striking the synthetic resin layer 18.

Anyhow, it has been observed from the experimental results that the FIG. 12 characteristic view can discriminate which direction of the front, rear and side the fluid comes from with respect to the synthetic resin layer 18.

Figure 13:
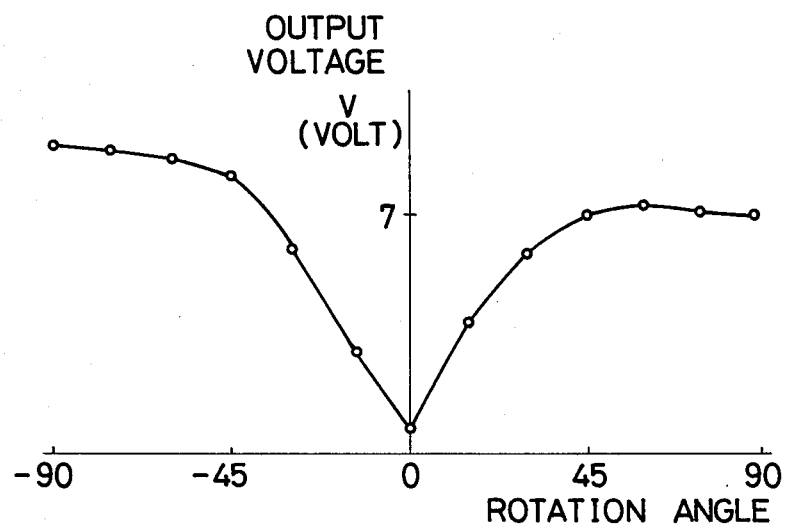
FIGS. 13 and 14 are characteristic views of the rotation angle to the output voltage when the fourth embodiment is rotated around the lengthwise axis.

The probe used in the above-mentioned experiment is used and rotated around the lengthwise axis of the support 2 in the fluid flowing at constant speed, thereby plotting the terminal voltage of the sensor 1 in FIG. 13, in which the rotation angle is taken on the axis of abscissa and the output voltage is taken on the axis of ordinate, where an angle of the fluid coming perpendicularly to the end face 19 is assumed 0° and the counterdockwise rotating side is assumed the minus and the clockwise rotating side the plus.

From FIG. 13 showing the above experimental results, it is judged that the output characteristic is substantially symmetric at both sides of the degree 0, but the output in an area (−90° to 0°) where the fluid arrives at the surface forming thereon the synthetic resin layer 18 is slightly larger than that in an area (0° to 90°) where the fluid arrives at the opposite surface to the synthetic resin layer 18.

Figure 14:
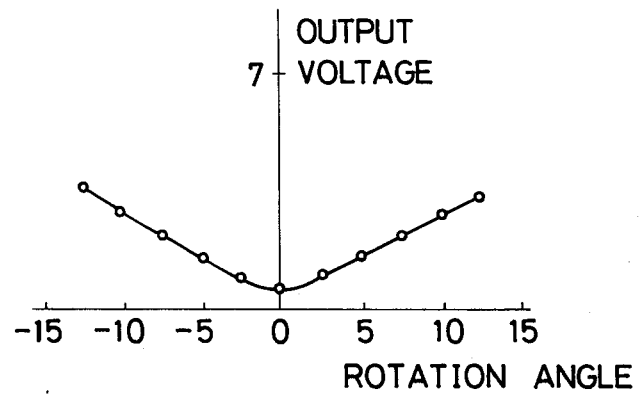

In addition, FIG. 13 is enlarged in the vicinity of the angle of 0° and shown in FIG. 14.

From the above experimental results, it is found that the synthetic resin layer is formed at one surface so that an output changing with respect to the direction of fluid is obtainable, thereby enabling the wind speed to be measured and also the wind direction to be done so.

Fifth Embodiment

Figure 15:
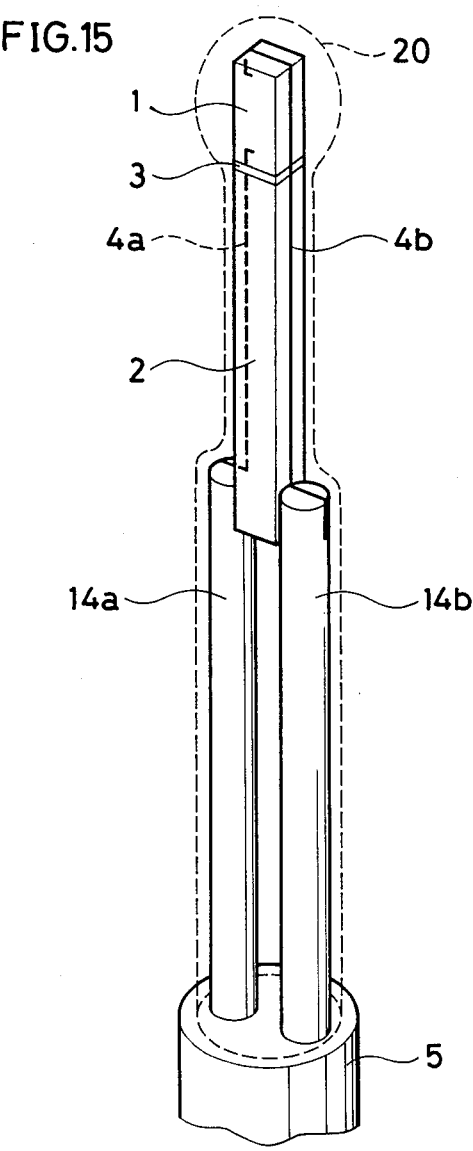
FIG. 15 is a perspective view explanatory of a fifth embodiment of the fluid speed or direction measuring apparatus of the invention.

FIG. 15 is a perspective view explanatory of a fifth embodiment of the invention. The fifth embodiment aims at measuring the fluid speed regardless of the direction of the fluid, in which the probe in the second embodiment is used as shown, a sensor 1 is coated by a sheath material 20 about spherically in axial symmetry, and a support 2 and support poles 14a and 14b are coated by the same, thereby eliminating the directivity around the lengthwise axis of the sensor 1.

The sheath material 20 used herein may utilize various kinds of materials, when they are at least electrically insulating. For example, a material as the same as the synthetic resin layer 18 in the fourth embodiment is available.

The probe is formed as the same as that used in the experiment of the second embodiment and the sensor 1 coated spherically with epoxy resin has been set in the fluid for the experiment.

Figure 16:
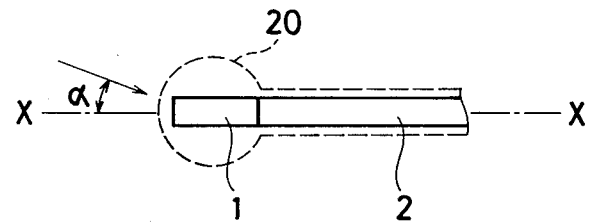
FIG. 16 is an illustration of an experimental condition of the fifth embodiment.

The experiment has been carried out under the condition that the fluid speed U is 5 m/sec, a resistance series circuit used in the fourth embodiment and of output voltage of 30 V and resistance of 300Ω is used, and the axis of the support 2 is represented by X, and an angle between the axis X and the direction of the fluid is represented by α as shown in FIG. 16, thereby measuring terminal voltage of sensor 1.

Figure 17:
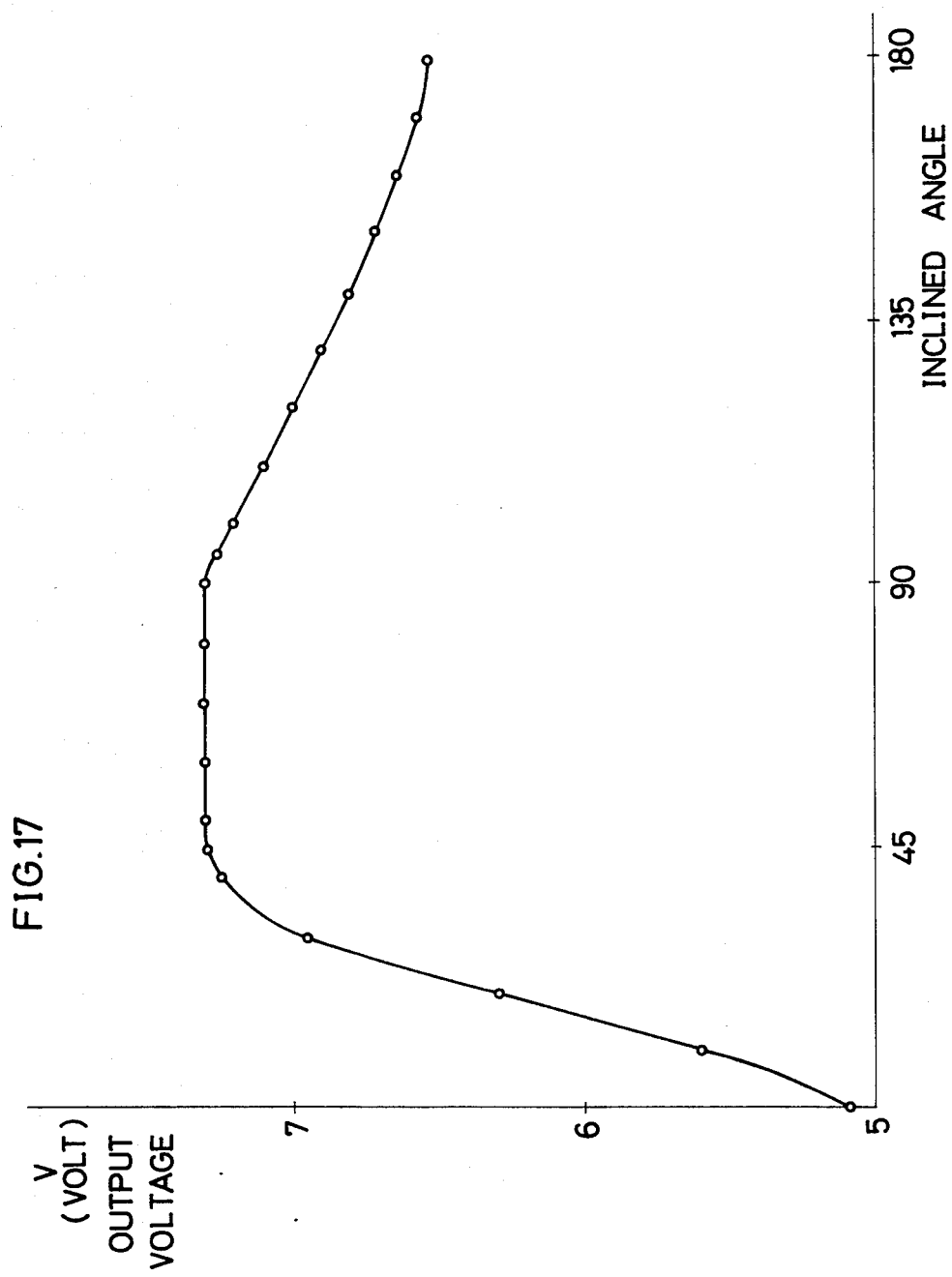
FIG. 17 is a characteristic view of the inclined angle to the output voltage in the experiment of including the lengthwise axis of the fifth embodiment with respect to the flowing direction of the fluid.

The measurement result is shown in FIG. 17, in which voltage across the terminals of the probe is taken on the axis of ordinate and the rotation angle on the axis of abscissa.

From the above result, it can be read that the voltage rises at a substantially constant tilt angle in a range of 0° to 45° of angle α, is constant in a range of 45° to 90° of angle α, and falls at a constant tilt angle gentler than that when rising, in a range of 90° or more.

In addition, when the direction of fluid is made perpendicular with respect to the longitudinal direction of the sensor 1 and the sensor 1 is rotated around the support 2, the output has scarcely changed.

From the above-mentioned result, it is found that the output is constant with respect to the fluid coming from in the range of 45° to 90° to the lengthwise direction of the sensor 1 so that the output voltage can decide the fluid speed U in the above range regardless of the direction of fluid.

When the probe is rotated around the axis of support 2, the output characteristic is constant because synthetic resin is formed in axial symmetry. When the probe is rotated at an angle of α, the tilt angle is different when below 45° and over 90°, which is affected by the support 2.

Sixth Embodiment

Figure 18:
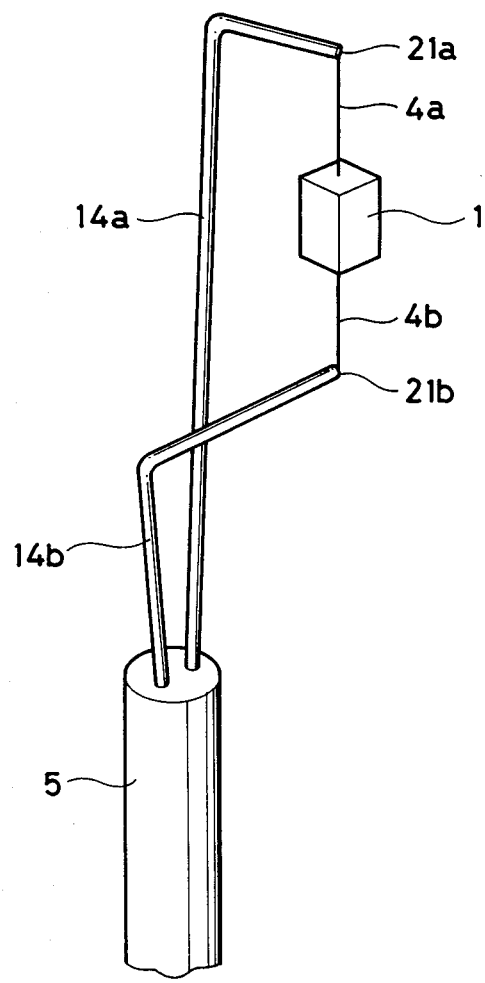
FIG. 18 is a perspective view explanatory of a sixth embodiment of the fluid speed or direction measuring apparatus.

FIG. 18 is a perspective view explanatory of a sixth embodiment of the invention. This embodiment aims at non-directivity as the same as the fifth embodiment. As shown in FIG. 18, two support poles 14a and 14b different in length from each other and of the same material as the support pole used in the second embodiment are erected on a support base 5, and bent at the proper portions respectively so that the end 21a of the bent pole 14a and the end 21b of the bent pole 14b are vertically aligned. Lead wires 4a and 4b having strength and formed of good electrical conductor, such as platinum or tungsten, are soldered and fixed to the ends 21a and 21b, the lead wire 4a hanging one end of the sensor 1, the lead wire 4b connecting with the other end of the same.

Such construction can eliminate to some extent difficulty in the speed measurement of the fluid flowing from the support 2 because the speed measurement is affected by the support 2 used in each embodiment.

The probe, however, is hung by the lead wires 4a and 4b, thereby having a drawback in strength and limiting the kind of the fluid.

Then, this probe is suitable for measurement of a fluid of less viscosity and that flowing at slow speed.

Seventh Embodiment

FIG. 19 is a perspective view explanatory of a seventh embodiment of the fluid speed or direction measuring apparatus of the invention, in which reference numeral 22 designates a cross-shaped support pole of ceramic of good electrical insulator and superior in adiabatic property. The pole 22 comprises cross-shaped rods having three end faces thereof onto which sensors to be discussed below are fixed.

In addition, the cross-shaped support pole 22 may use other inorganic material, such as glass, or synthetic resin.

Reference numerals 14a, 14b, 14c and 14d designate tubular support poles erected in parallel to each other on the upper surface of a support base 5 set in the fluid and formed of metal superior in electrical conductivity and high in corrosion resistance, the support poles 14a, 14b, 14c and 14d fixedly holding therebetween one end of the cross-shaped support 22.

Reference numerals 1a, 1b and 1c designate sensors of small pieces of germanium single crystal fixed to the three end faces of the cross-shaped support 22 through adhesive layers 3 respectively.

Also, reference numerals 4a, 4b, 4c and 4d designate lead wires fixed by vapor-deposition onto one end faces of the sensors 1a, 1b and 1c and extending along the side surface of the cross-shaped support 22 respectively. The lead wires 4a, 4b and 4c are fixed to the support poles 14a, 14b and 14c respectively and those 4d are collected into one and fixed to the support pole 14d by being bonded with an electrically conductive adhesive or soldered.

A vertically erected portion at the cross-shaped support 22 is represented by a vertical support 23 and a portion of the same perpendicular to the vertical support 23 is represented by a horizontal support 24.

The vertical support rod 23 and sensor 1a mounted thereon constitute a probe A1, and the horizontal support rod 24 and sensors 1b and 1c mounted thereon constitute probes A2 and A3 respectively.

However, the support base 5 is provided on an apparatus, such as a pulse motor or a servo mechanism, detectable of its rotation angle, thereby being rotated.

The probes A1, A2 and A3 have the directivity in a constant angular range with respect to the longitudinal direction of each probe.

Figure 22:
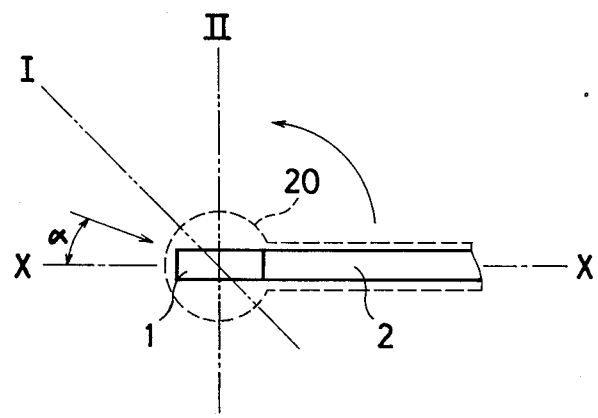
FIG. 22 is an illustration of the experiment therefor.

The above matter will further be discussed below. Referring to FIG. 22, an output of each sensor is lengthwise constant in a range of angle of 45° to 90° so that the sensors are used for measuring the fluid speed and direction by utilizing the directivity of each sensor.

In FIG. 22, an angle of 45° from the lengthwise axis of each probe is seen by the phantom line I and that of 90° by the phantom line II in the drawing.

In other words, the range of constant angle shown by two references I and II, that is, the range of 45° to 90°, the respective probes have the constant output.

Figure 23:
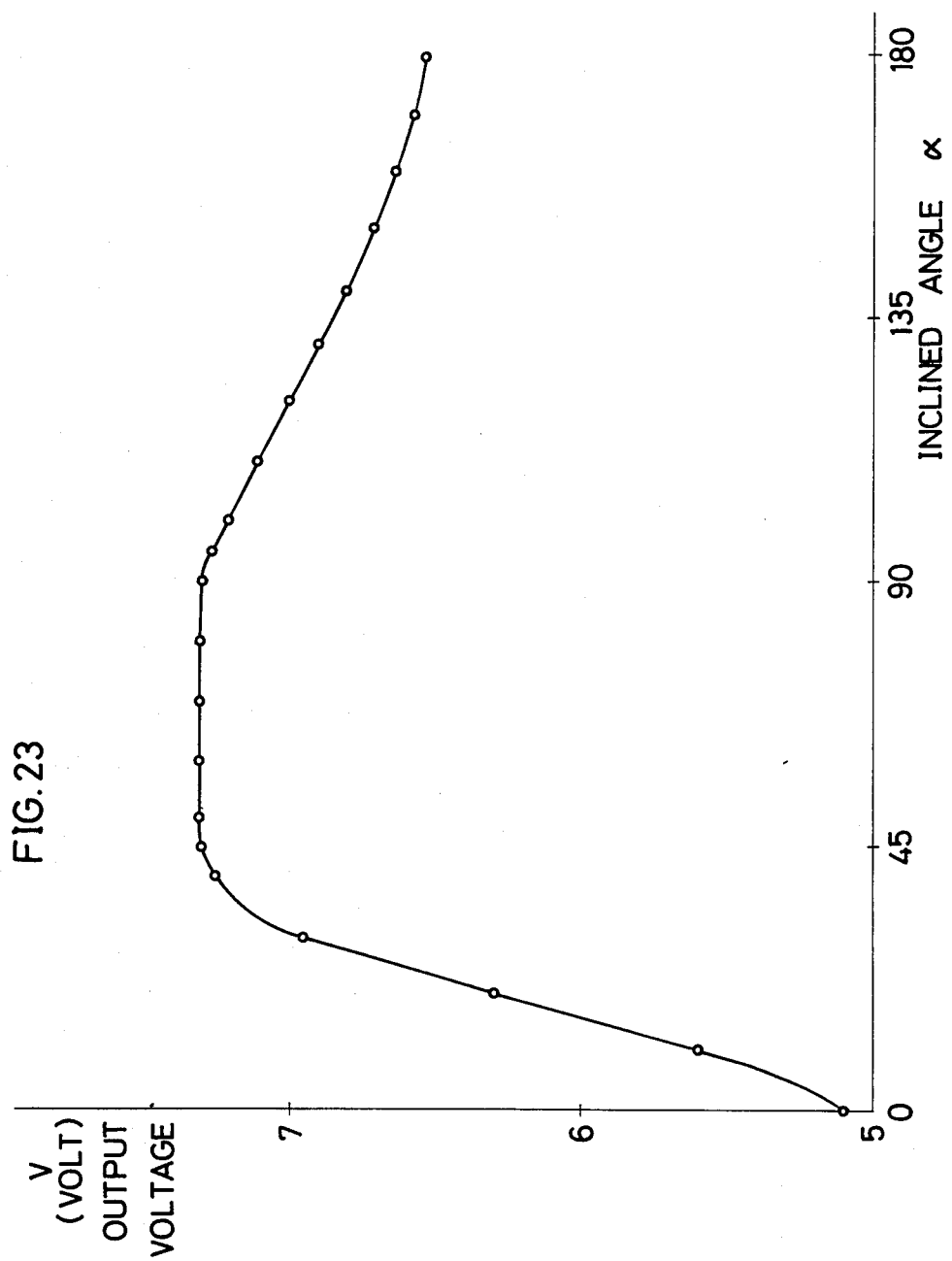
FIG. 23 is a characteristic view of the inclined angle to the output voltage when the lengthwise axis of the seventh embodiment is inclined with respect to the flowing direction of the fluid in the experiment of the seventh embodiment.

The above matter will be understood by that the output voltage, as shown in FIG. 23, is constant in a range of 45° to 90° and lowers at other portions.

In addition, in FIG. 19, reference numeral 20 designates a sheath material for coating about spherically the sensors 1a, 1b and 1c and the probes toward the end face 25 of the support base 5. The sheath material 20 may use various materials when having at least the electrical insulating property. For example, synthetic resin, such as epoxy resin, silicon resin, aniline resin, phenol resin, polyester resin, or urethane resin, or an inorganic material, such as ceramics or glass, are available.

Now, we would consider one support rod of the cross-shaped support rod 22 as the prerequisite for measuring the fluid speed and direction by use of the fluid speed or direction measuring apparatus of the invention, the one support rod being subjected to experiment as the single body probe. The experimental results will be shown as follows:

FIG. 20 is a perspective view explanatory of the single body probe used in the above experiment.

In FIG. 20, reference numeral 1 designates a rectangular parallelepiped sensor of a small piece of germanium single crystal. Lead wires 4a and 4b of good electrical conductor, such as gold, silver or platinum, are vapor-deposited and fixed to the upper and lower ends of one side surface of the sensor 1.

In addition, the sensor 1 may be global or cylindrical, and is not particularly defined.

Reference numeral 2 designates a support fixed to one lengthwise end of the sensor 1 through an adhesive layer 3, such as epoxy resin. The support 2 is rod-like-shaped ceramic of electrical insulating material arid superior in the adiabatic property, where other inorganic material, such as glass, or synthetic resin may be used for the support 2.

Reference numerals 14a and 14d designate support poles erected in parallel to each other on the end 25 of the support base 5 and formed of a metallic cylinder of stainless steel or the like, high in electric conductivity, and less probability of corrosion. The support 2 is held at the lower end thereof between the upper portions somewhat below the upper ends of the support poles 14a and 14d, the lead wires 4a and 4d being fixed thereto by bonding with an adhesive or by soldering.

The substantially cylindrical support poles 14a and 14d hold therebetween the support 2 to extremely reduce a contact area between the support poles 14a and 14d and the support 2, thereby preventing an error in measurement from being caused by a temperature drop at the sensor 1 due to heat conduction from the sensor 1 to the support poles 14a and 14d through the support 2.

Reference numeral 20 designates an insulating sheath material. For the sheath material 20 in use, various kinds of materials of at least electrical insulator may be available. For example, synthetic resin, such as epoxy resin, silicon resin, aniline resin, phenol resin, polyester resin or urethane resin, and an inorganic material, such as ceramic or glass, are usable as the same as the aforesaid embodiments. The sheath material 20 in this embodiment, as shown, covers about spherically the sensor 1, support 2, and support poles 14a and 14b, thus coating the entire probe toward the end face 25 of the support base 5.

Thus, the sensor 1 is about spherically coated to expect elimination of the directivity around the lengthwise axis of sensor 1.

Figure 21:
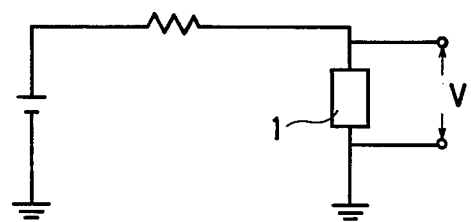
FIG. 21 is a circuit diagram of the experiment for the seventh embodiment.

Referring to FIG. 21, an experimental example using the single body probe is shown, in which a series resistance circuit connecting the sensor 1 in series with a dc supply voltage +30 V through resistance of 300 Ω is used, thereby measuring voltage across the terminals of the probe.

The probe used herein comprises the sensor 1 of an about rectangular parallelepiped of germanium single crystal of $0.3 \times 0.3 \times 1$ mm, the support 2 of 5 mm in length and support poles 14a and 14d each of 0.5 mm in diameter and 6.5 mm in length, and is coated with the sheath material 20 of synthetic resin.

Under the external condition of the fluid speed of 5 m/sec and the constant direction of the flow of fluid, as shown in FIG. 22, the axis X is taken lengthwise of the sensor 1 and an angle of the fluid flow with respect to the axis X is represented by $\alpha$ so that the probe is rotated in the direction of the arrow from the position shown by the solid line through the position shown by the phantom lines II and I.

FIG. 23 shows the experimental result plotted under the above condition, in which voltage across the terminals of the probe is taken on the axis of ordinate and the angle $\alpha$ on the axis of abscissa.

In addition, when the angle $\alpha$ is 90°, the probe is rotated by an angle of 360° at the position of angle of 90° and voltage V across the terminals of sensor 1 has been measured, resulting in that the constant output has always been delivered.

In addition, the forms of the sensor and single body probe are not defined to the above embodiment, but may be available when the sensor has a characteristic to obtain the constant output in a range of constant degree of the angle $\alpha$, that is, in the range of 45° to 90°.

From the experimental result, it is found that the voltage rapidly rises for 0° to 45° of angle of fluid flow with respect to the axis X, is constant for 45° to 90°, and falls for 90° to 180° more gently than the rise.

From the above, it is seen that, when the angle $\alpha$ is in a range of 45° to 90°, the fluid speed is measurable with accuracy regardless of the value of angle α and, the constant output range of the single body probe used in this embodiment is from 45° to 90° with respect to the lengthwise axis of the probe.

Since the sensor 1 at the single body probe is coated spherically with the sheath material 20, the above-mentioned constant output characteristic is developed with respect to every direction around the lengthwise axis.

Then, the single body probe is constituted in the fluid speed or direction measuring apparatus shown in FIG. 19 and disposed within the fluid to thereby measure the fluid speed and direction.

Figure 24:
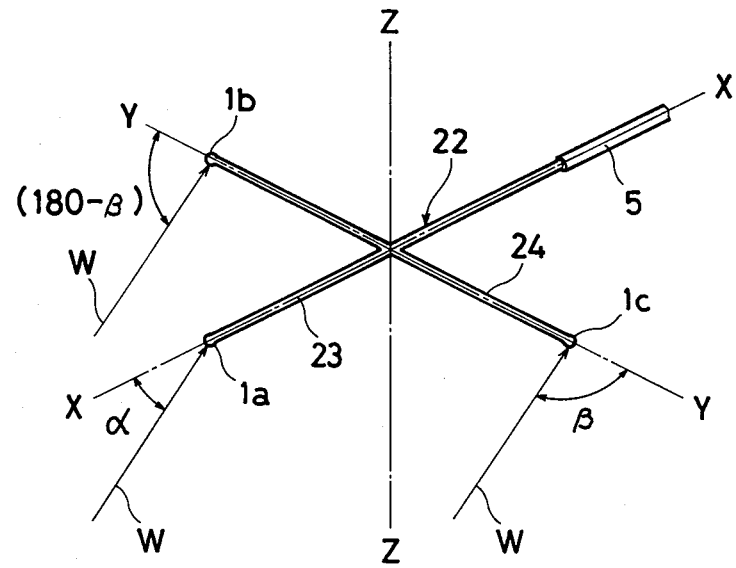
FIG. 24 is a schematic view explanatory of condition of the seventh embodiment placed in the fluid.

FIG. 24 is a schematic view explanatory of a condition of disposing within the fluid the fluid speed or direction measuring apparatus of the invention, in which the vertical support rod 23 is taken on the axis X, the horizontal support rod 24 on the axis Y, and the axis passing the intersection of the axes X and Y and extending perpendicularly to the axes X and Y is represented by the axis Z.

Now, in FIG. 24, the fluid flow shown in the arrow is represented by each fluid vector W.

The fluid vector W inclines with respect to the axes X, Y and Z respectively so that a tilt angle between the fluid vector W and the axis X is represented by α, and that between the fluid vector W and the axis Y by β.

Figure 25:
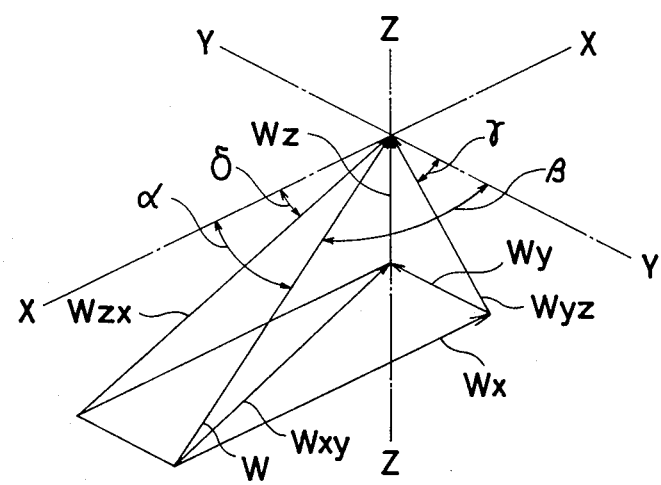
FIG. 25 is an illustration of the fluid vector.

Also, as shown in an enlarged illustration of the fluid vector W in FIG. 25, the components of the fluid vector W in the directions of the axes X, Y and Z are represented by Wx, Wy and Wz, the component Wx+Wy by vector Wxy, the component Wy+Wz by vector Wyz, and the component Wz+Wx by vector Wzx.

At this time, angles between the sensors 1a, 1b and 1c and the fluid vector W are α, (180−β), and β respectively.

However, the angle between each sensor and the fluid vector W is taken from an extension line extending reversely to the support rod fixedly supporting each sensor and in the lengthwise direction thereof.

Figure 26:
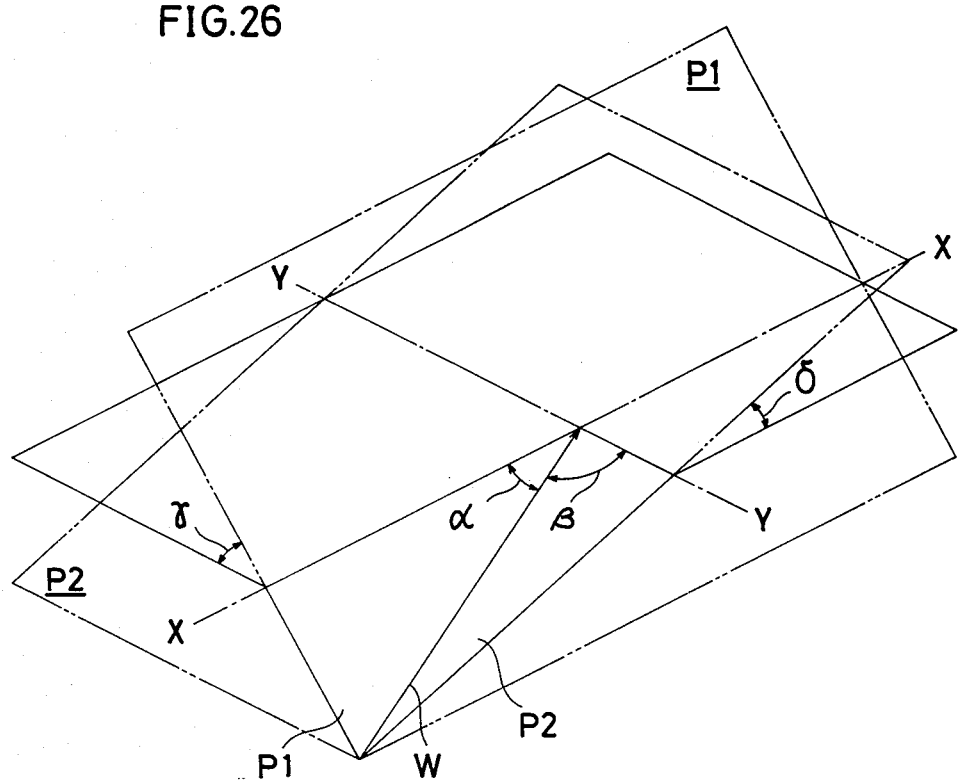
FIG. 26 is a plan view explanatory of the seventh embodiment.

As shown in the illustration of FIG. 26, when the plane passing the axis X and including the fluid vector W is represented by P1 and that passing the axis Y and including the fluid vector W by P2, the fluid vector W exists on the intersecting line of the planes P1 and P2.

Angles between the planes P1 and P2 and the plane XY are represented by γ and δ respectively, the angles γ and δ being an angle between the vector Wyz and the axis Y and that between the vector Wzx and the axis X respectively.

In the seventh embodiment, an error is caused in measurement by the effect of the support base 5 and cross-shaped support 22, whereby this embodiment will be studied in a range from −90° to 90° of the angle α between the sensor 1a mounted on the vertical support rod 23 and the fluid vector W, in which outputs of the single body probes A1, A2 and A3 are represented by E0, E1 and E2 respectively and the fluid speed by U.

At first, a case where the fluid speed is measured in condition of keeping the probe stationary is considered.

Figure 27:
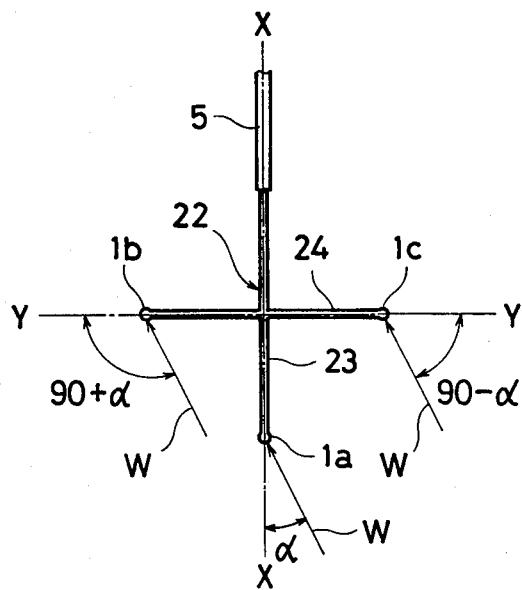
FIG. 27 is a schamatic plan view explanatory of a cross-shaped support rod at the seventh embodiment.

Now, FIG. 27 is a plan view of the cross-shaped support 22 when the fluid vector W is on the plane XY.

At this time, Wz: the component Z of fluid vector W, becomes zero, the vector Wxy and fluid vector W are identical with each other, and the angle γ between the vector Wyz and the axis Y and that δ between the vector Wzx and the axis X, both become 0°.

Since the sensors 1a, 1b and 1c disposed at the vertical support rod 23 and horizontal support rod 24 and the fluid vector W are on the same plane, an angle β is equal to (90°−α) and angles between the fluid vector W and the sensors 1a, 1b and 1c are α, (90°+α) and (90°−α) respectively, where an angle between each sensor and the fluid vector W is taken with respect to the extension line extending lengthwise of the sensor.

When the angle α is ranged from 45° to 90° and from −45° to −90°, the sensor 1a is included in a range of the constant output, when the same is ranged from 0° to 45°, the sensor 1c is in the constant output range, and when the same is ranged from 0° to −45°, the sensor 1b is in the constant output range, so that the sensor within the constant output range takes the maximum value of the outputs E0, E1 and E2 of the sensors 1a, 1b and 1c at each case of angle α.

From this, at least one of the sensors 1a, 1b and 1c is included in the constant output range so that the maximum one of the outputs E0, E1 and E2 of the sensors 1a, 1b and 1c is adopted to enable the fluid speed U to be decided.

Next, in consideration of a case where the fluid vector W inclines with respect to the plane XY, it is examined how the constant output range covers the direction of the fluid vector W in range of the angle α, for example, from 0° to 90°.

At this time, it is apparent that the angles α and β are in a range of 0° to 90°, that is, $$0 \leq \alpha \leq 90 \qquad ①$$

$$0 \leq \alpha \leq 90 \qquad ②.$$

When the fluid vector W is on the plane XY, α+β=90 is obtained as aforesaid, (α+β) increases as the fluid vector W more inclines with respect to the plane XY, and (α+β) becomes maximum when the fluid vector W is on the axis Z, at which time α=β=90 or α+β=180 is obtained, that is, $$90 \leq \alpha + \beta \leq 180 \qquad ③.$$

The angles α and β each are independent in a range of meeting the above condition, the sensor 1a is in the constant output range when the angle α is in a range of 45° to 90°, and the sensor 1c is in the constant output range when the angle β is in a range of 45° to 90°.

Now, when the angle α is in the range of 0° to 45°, from 0≦α≦45 and the above inequalities ② and ③, clearly $$45 \leq \beta \leq 90$$

is obtained.

In brief, when the angle α is in a range of 0° to 90° and the sensor 1a is out of the constant output range, the sensor 1c also is out thereof, which clarifies that the sensor 1a covers the range of the sensor 1c out of the constant output range thereof even on the basis of the angle β.

In the drawing, only one of eight quadrants formed by the axes X, Y and Z is taken into consideration, but it is apparent that the output characteristic of each sensor is symmetric with respect to the plane XY and that the sensors 1a and 1b, as the same as above-mentioned, cover the constant output range with each other when the angle α is in a range of 0° to −90°. Hence, in consideration of the fluid flowing from a side of the support base 5 together with the premise of not thinking the four quadrants from the plane YZ toward the support base 5, it is enough to consider only one quadrant shown in the drawing.

Thus, since at least one of the outputs E0, E1 and E2 of the sensors 1a, 1b and 1c is the constant output with respect to the fluid flowing from every direction of the upper surface of the support base 5, in other words, when the maximum value of E0, E1 and E2 is adopted, this probe can decide the fluid speed.

Next, measurement of the fluid speed and direction by use of the fluid speed or direction measuring apparatus of the invention will be considered.

Now, in general, when the cross-shaped support 22 and fluid vector W are on the same plane, the component of the fluid vector in the direction of the axis X perpendicular to the vertical support rod 23 and horizontal support rod 24 at the cross-shaped support 22 need not be considered. When a plan view of the cross-shaped support 22 is depicted, the angle $\alpha$, as shown in FIG. 27, is developed as an angle between the sensor 1a fixed to the vertical support rod 23 and the fluid vector W.

Also, angles of the fluid vector W with respect to the sensors 1b and 1c fixed to the horizontal support rod 24 are represented by $(90° + \alpha)$ and $(90° - \alpha)$ respectively, where the angle at this time is taken from the extension line extending lengthwise of each sensor and reversely to the support rod to which each sensor is fixed.

When the angle $\alpha$ is 0° to 45°, the output E0 of the sensor 1a at the vertical support rod 23 is out of the constant output range as seen from the experimental result of the single body probe in FIG. 23, whereby when the constant output is compared with the output E0 of sensor 1a at this time, the angle can be obtained. In a case where the angle $\alpha$ is in the range of 45° to 90°, the sensor 1a at the vertical support rod 23 is in a range of constant output and the sensors 1b and 1c at the horizontal support rod 24 are out of the constant output range. In FIG. 27, the angle $(90° - \alpha)$ between the sensor 1c and the fluid vector W is in a range of 0° to 45°, so that when the output E2 of sensor 1c is compared with the constant output as the same as the aforesaid embodiments, an angle of $(90° - \alpha)$ can be decided, in turn the angle $\alpha$.

Generally, the fluid vector W inclines with respect to the plane XY, so that when the inclination is represented by an angle $\gamma$ between the vector Wyz and the axis Y, it is apparent that in order to keep the aforesaid fluid vector and cross-shaped support 22 on the same plane, the cross-shaped support 22 need only be rotated by an angle $\gamma$ around the vertical support rod 23.

In a case where the fluid vector W exists in the plane perpendicular to the vertical and horizontal support rods 23 and 24, in other words, when the fluid vector W is parallel to the plane ZX, since the sensors 1b and 1c each have no directivity around the horizontal support rod 24, angles between the fluid vector W and the sensors 1b and 1c are 90° each when viewed from the lengthwise extension of each sensor, regardless of inclination of the direction of axis Z perpendicular to the vertical support rod 23 and horizontal support rod 24, whereby the sensors 1b and 1c develop the constant output.

In consideration of rotation of the cross-shaped support 22 around the vertical support rod 23, the cross-shaped support 22 rotates at an angle of 90° from the state where the same and the fluid vector W are on the same plane, which means that the same is rotated only by $(90° + \gamma)$ from the initial state, whereby when a rotation angle $\phi$ at this time is measured, the angle $\gamma$ is obtainable from $\gamma = \phi - 90$.

Hence, for obtaining the angle $\gamma$, the cross-shaped support 22 is rotated around the vertical support rod 23, thereby obtaining the point at which an angle between each sensor 1b or 1c and the fluid is 90°.

Figure 28:
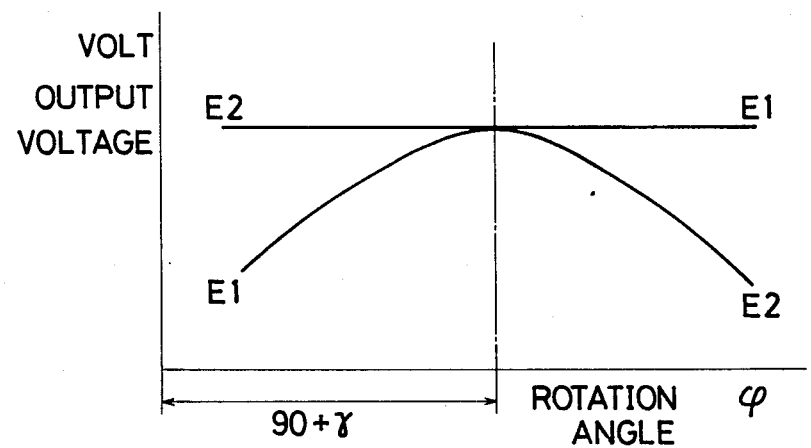
FIG. 28 is an illustration of a change in outputs of sensors 1b and 1c caused by rotation of the seventh embodiment.

During the rotation of cross-shaped support 22, the outputs E1 and E2 of the sensors 1b and 1c vary correspondingly to the angles between the sensors and the fluid vector W, which is shown schematically in FIG. 28.

Namely, the outputs E1 and E2 of the sensors 1b and 1c, when each making an angle of 90° with respect to the fluid, take the maximum value respectively. Since the sensors 1b and 1c are disposed at an angle of 180° from each other, the point of 90° is limited to one point within the rotation by 180°.

From the above, in order to obtain the angle $\gamma$, the cross-shaped support 22 at first is rotated around the axis X to be put in the condition that the horizontal support rod 24 passes the axis X and intercrosses at a right angle with the plane including the fluid vector W.

In other words, the cross-shaped support 22 need only be rotated until the sensors 1b and 1c disposed at the horizontal support rod 24 both develop the maximum outputs, at which time a rotation angle $\phi$ is equal to $(90 + \gamma)$.

Thus, the angle $\gamma$ between the horizontal support rod 24 and the vector Wyz in the initial state can be obtained by $\gamma = \phi - 90°$.

Next, the cross-shaped support 22 is rotated at angle of 90° so as to be put in the condition that the horizontal support rod 24 passes the axis X and exists on the plane formed by the fluid vector W, in other words, the horizontal support rod 24 is put on the plane P1.

Namely, the support 22 is put in condition of rotating only by the angle $\gamma$ from the initial state.

At this time, the sensors 1b and 1c exist on the plane passing the axis X and formed by the fluid vector W, at which time angles between the longitudinal axes of the sensors 1a, 1b and 1c and the direction of fluid are $\alpha$, $(90° + \alpha)$ and $(90° - \alpha)$ respectively.

Now, it is enough to examine the angle $\alpha$ in a range of 0° to 90° in consideration of that the cross-shaped support 22 is laterally symmetric and a hindrance occurs by the effect of the support base 5.

When the angle $\alpha$ is 0° to 45°, the output E0 of the sensor 1a mounted on the vertical support rod 23 is in a range of 0° to 45° in the output characteristic in FIG. 23, from which the constant output is compared with the output E0 of sensor 1a to thereby obtain the angle $\alpha$.

Also, when the angle $\alpha$ is 45° to 90°, the sensor 1a is in the constant output range, and the angle of $90° - \alpha$ between the sensor 1c mounted on the horizontal support rod 24 and the fluid vector W is in a range of 0° to 45°, whereby from the FIG. 23 characteristic view, the constant output and output E2 of sensor 1c are compared with each other and the angle of $90° - \alpha$ is obtainable, thus enabling the angle to be obtained.

Next, the fluid speed U will be decided.

In a case where the angle $\alpha$ obtained as the above-mentioned is 45° to 90°, the sensor 1a is in the constant output range, so that the output E0 of the sensor 1a can decide the fluid speed U.

Also, in a case where the angle $\gamma$ is in a range of 0° to 90°, the probe is rotated only by an angle of $90° + \gamma$ from the initial state to make angles between the sensors 1b and 1c and the fluid vector W to be 90°, thereby deciding the fluid speed U by the outputs E1 and E2 of the sensors 1b and 1c, where, to make sure, the outputs E1 and E2 of the sensors 1b and 1c at this time are averaged to thereby decide the fluid speed by U=(E1+E2)/2.

Thus, the object of the present invention to measure the fluid speed and direction is attained with ease. The sensors 1a, 1b and 1c, which are formed of germanium single crystal, are different from the conventional heating coil type in that they have no fear of oxidization or disconnection, are strong in construction, and coated by the sheath material 20 of synthetic resin or the like so as to be protective for electrical insulating and water resistance, thereby enabling measurement of the speed and direction of almost all the fluids.

Also, each sensor coated with the sheath material 20 is changed in its characteristic, thereby enabling the sensor of necessary characteristic to be obtained with ease.

Eighth Embodiment

Figure 29:
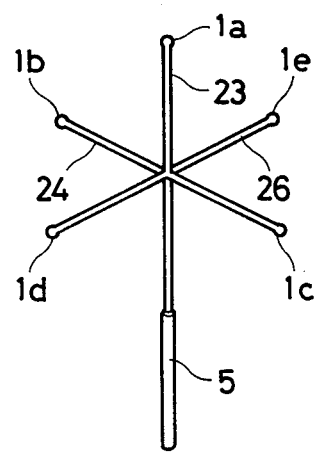
FIG. 29 is a schematic perspective view explanatory of an eighth embodiment of the invention.

In order to improve the measurement accuracy more than the seventh embodiment when the fluid speed or direction measuring apparatus of the invention is used to measure the speed and direction of flow of the fluid, as shown in FIG. 29 of a schematic perspective view explanatory of the eighth embodiment, a fluid speed or direction measuring apparatus need only be used which is provided with a horizontal support rod 26 projecting from the intersection of the vertical support rod 23 and horizontal support rod 24 frontward and rearward thereof and fixedly carrying at both ends sensors 1d and 1e the same as those 1a, 1b and 1c fixed to the utmost end of vertical support rod 23 and both ends of horizontal support rod 24.

Thus, the eighth embodiment of the fluid speed or direction measuring apparatus of the invention, when in use, adopts the maximum output value of the sensors 1a, 1b, 1c, 1d and 1e as the same as the seventh embodiment, thereby enabling the fluid speed to be decided. Also, this embodiment can reduce an angle of rotating the probe around the vertical support rod 23 in comparison with that in the seventh embodiment, thereby enabling the measurement accuracy to be improved.

Although several embodiments have been described, they are merely exemplary of the invention and not to be constructed as limiting, the invention being defined solely by the appended claims.

What is claimed is:

1. A fluid speed or direction measuring apparatus, comprising:
    a sensor composed of a small piece of single crystal germanium and having a rod-like shape;
    a rod-like support fixed to said sensor, end to end;
    a pair of metal wires, each conductively fixed to opposing ends of said sensor; and
    power means, electrically connected to said wires, for supplying electric power to said sensor, such that said sensor remains at a constant temperature, and for determining the speed or direction of the fluid based on the variation of voltage, current or power level flowing through said sensor, caused by a variation in resistance of said sensor when a temperature change in said sensor occurs through contact with the fluid.

2. The fluid speed or direction measuring apparatus of claim 1, wherein said metal wires are fixed to said sensor by vapor deposition.

3. A fluid speed or direction measuring apparatus, comprising:
    a support base;
    a pair of electrically conductive cylindrical support poles generally parallel with one another and spaced apart therefrom, said support poles extending from an upper surface of said base;
    a rod-like support fixed between said poles and oriented generally parallel with respect thereto;
    a rod-like sensor composed of a piece of single crystal germanium fixed end to end to said rod-like support;
    a pair of metal wires, each conductively fixed to opposing ends of said sensor; and
    power means, electrically connected to said wires, for supplying electric power to said sensor, such that said sensor remains at a contant temperature, and for determining the speed or direction of the fluid based on the variation of voltage, current or power level flowing through said sensor, caused by a variation in resistance of said sensor when a temperature change in said sensor occurs through contact with the fluid.

4. The fluid speed or direction measuring apparatus of claim 3, wherein said metal wires are fixed to said sensor by vapor deposition.

5. The fluid speed or direction of claim 4, wherein an end of each of said wires, opposite from an end fixed to said sensor, is electrically connected to a corresponding one of said poles, such that said poles connect said wires to said power means.

6. The fluid speed or direction measuring apparatus of claim 5, wherein said support is fixed near the ends of said support poles opposite from said support base and extends beyond said support poles.

7. A fluid speed or direction measuring apparatus, comprising:
    a sensor composed of a small piece of single crystal germanium and having a rod-like shape;
    a rod-like support fixed to said sensor at a central side portion of said sensor between opposing ends thereof;
    a pair of metal wires, each conductively fixed to opposing ends of said sensor; and
    power means, electrically connected to said wires, for supplying electric power to said sensor, such that said sensor remains at a constant temperature, and for determining the speed or direction of the fluid based on the variation of voltage, current or power level flowing through said sensor, caused by a variation in resistance of said sensor when a temperature change in said sensor occurs through contact with the fluid.

8. The fluid speed or direction measuring apparatus of claim 7, wherein said metal wires are fixed to said sensor by vapor deposition.

9. The fluid speed or direction measuring apparatus of claim 8, wherein said rod-like support is mounted on a pair of electrically conductive support poles generally parallel with one another and spaced apart therefrom, and which extend from an upper surface of a support base.

10. The fluid speed or direction measuring apparatus of claim 9, wherein said support poles are generally cylindrical in shape.

11. The fluid speed or direction measuring apparatus of claim 10, wherein the ends of said wires opposite from ends connected to said sensor are connected to said support poles, respectively, such that said poles connect said wires to said power means.

12. The fluid speed or direction measuring apparatus of claim 11, wherein said support is fixed near ends of said support poles opposite from said support base and extends beyond said support poles.

13. A fluid speed or direction measuring apparatus, comprising:
   a sensor composed of a small piece of single crystal germanium and having a rod-like shape;
   a rod-like support fixed to said sensor at a central side portion of said sensor between opposing ends thereof;
   a synthetic resin layer formed on one of opposing side surfaces adjacent said central side portion fixed to said support;
   a pair of metal wires, each conductively fixed to opposing ends of said sensor; and
   power means, electrically connected to said wires, for supplying electric power to said sensor, such that said sensor remains at a constant temperature, and for determining the speed or direction of the fluid based on the variation of voltage, current or power level flowing through said sensor, caused by a variation in resistance of said sensor when a temperature change in said sensor occurs through contact with the fluid.

14. The fluid speed or direction measuring apparatus of claim 13, wherein said metal wires are fixed to said sensor by vapor deposition.

15. The fluid speed or direction measuring apparatus of claim 14, wherein said rod-like support is mounted on a pair of electrically conductive support poles generally parallel with one another and spaced apart therefrom, and which extend from an upper surface of a support base.

16. The fluid speed or direction measuring apparatus of claim 15, wherein said support poles are generally cylindrical in shape.

17. The fluid speed or direction measuring apparatus of claim 16, wherein the ends of said wires opposite from ends connected to said sensor are connected to said support poles, respectively, such that said poles connect said wires to said power means.

18. The fluid speed or direction measuring apparatus of claim 17, wherein said support is fixed near ends of said support poles opposite from said support base and extends beyond said support poles.

19. A fluid speed or direction measuring apparatus, comprising:
   a support base;
   a pair of electrically conductive support poles generally parallel with one another and spaced apart therefrom, said support poles extending from an upper surface of said base;
   a rod-like support fixed between said poles and oriented generally parallel with respect thereto;
   a rod-like sensor composed of a piece of single crystal germanium fixed end to end to said rod-like support;
   a pair of metal wires, each conductively fixed to opposing ends of said sensor;
   an electrically insulating sheath material spherically coating at least said sensor; and
   power means, electrically connected to said wires, for supplying electric power to said sensor, such that said sensor remains at a constant temperature, and for determining the speed or direction of the fluid based on the variation of voltage, current or power level flowing through said sensor, caused by a variation in resistance of said sensor when a temperature change in said sensor occurs through contact with the fluid.

20. The fluid speed or direction measuring apparatus of claim 19, wherein said metal wires are fixed to said sensor by vapor deposition.

21. The fluid speed or direction measuring apparatus of claim 20, wherein said support poles are generally cylindrical in shape.

22. The fluid speed or direction measuring apparatus of claim 21, wherein said support is fixed near ends of said support poles opposite from said support base and extends beyond said support poles.

23. The fluid speed or direction measuring apparatus of claim 22, wherein said support and support poles are coated integrally with said sensor by said sheath material.

24. The fluid speed or direction measuring apparatus of claim 23, wherein said sheath material is synthetic resin.

25. A fluid speed or direction measuring apparatus, comprising:
   a support base;
   a cross-shaped support rod having a vertical member fixed at one end of said support base and having an opposing free end, and a horizontal member having two opposing free ends;
   a plurality of sensors, one fixed to each of the free ends of said horizontal and vertical members, each sensor being composed of a small piece of single crystal germanium;
   a plurality of metal wires, each one corresponding to one of said sensors and each wire being conductively fixed to a corresponding sensor; and
   power means, electrically connected to said wires, for supplying electric power to said sensors such that said sensors remain at a constant temperature, and for determining the speed or direction of the fluid based on the variation of voltage, current or power level flowing through said sensors, caused by a variation in resistance of said sensors when a temperature change in said sensors occurs through contact with the fluid.

26. The fluid speed or direction measuring apparatus of claim 25, wherein said support base includes a base member, and four support poles extending from an upper surface of said base member and being generally parallel with one another and spaced apart from one another, such that said cross-shaped support rod is fixedly held between said four support poles at a position opposite said base member.

27. The fluid speed or direction measuring apparatus of claim 26, wherein each piece of single crystal germanium of each sensor has a rectangular parallelepiped shape having a front end face facing outward, and an opposing rear end face fixed to its support member, such that in a predetermined range of angles measured by taking the angle between a lengthwise extension line extending outward from each vertical or horizontal support member and the direction of flow of the fluid, each piece of single crystal germanium delivers a constant output within said predetermined range of angles, and decreases in output corresponding to a variation in an angle outside of said predetermined range of angles.

28. The fluid speed or direction measuring apparatus of claim 27, wherein said predetermined range of angles is from 45° to 90°.

29. The fluid speed or direction measuring apparatus of claim 28, wherein at least said sensors are coated by an electrically insulating sheath material.

30. The fluid speed or direction measuring apparatus of claim 29, wherein said cross-shaped support rod and said support poles are coated integrally with said sensors by said electrically insulating sheath material.

31. The fluid speed or direction measuring apparatus of claim 30, wherein said sheath material is synthetic resin.

32. A fluid speed or direction measuring apparatus, comprising:
 a support base;
 a cross-shaped support rod having a vertical member fixed at one end of said support base and having an opposing free end, a first horizontal member having two opposing free ends, and a second horizontal member projecting from the intersection of said vertical and first horizontal members and extending perpendicular to both said vertical and first horizontal members;
 a plurality of sensors, one fixed to each of the free ends of said vertical, first horizontal, and second horizontal members, each sensor being composed of a small piece of single crystal germanium;
 a plurality of metal wires, each one corresponding to one of said sensors and each wire being conductively fixed to a corresponding sensor; and
 power means, electrically connected to said wires, for supplying electric power to said sensors such that said sensors remain at a constant temperature, and for determining the speed or direction of the fluid based on the variation of voltage, current or power level flowing through said sensors, caused by a variation in resistance of said sensors when a temperature change in said sensors occurs through contact with the fluid.

33. The fluid speed or direction measuring apparatus of claim 32, wherein said support base includes a base member, and a plurality of support poles extending from an upper surface of said base member and being generally parallel with one another and spaced apart from one another, such that said cross-shaped support rod is fixedly held between said plurality of support poles at a position opposite from said base member.

34. The fluid speed or direction measuring apparatus of claim 33, wherein each piece of single crystal germanium of each sensor has a rectangular parallelepiped shape having a front end face facing outward, and an opposing rear end face fixed to its support member, such that in a predetermined range of angles measured by taking the angle between a lengthwise extension line extending outward from each vertical or horizontal support member and the direction of flow of the fluid, each piece of single crystal germanium delivers a constant output within said predetermined range of angles, and decreases in output corresponding to a variation in an angle outside of said predetermined range of angles.

35. The fluid speed or direction measuring apparatus of claim 34, wherein said predetermined range of angles is from 45° to 90°.

36. The fluid speed or direction measuring apparatus of claim 35, wherein at least said sensors are coated by an electrically insulating sheath material.

37. The fluid speed or direction measuring apparatus of claim 36, wherein said cross-shaped support rod and said support poles are coated integrally with said sensors by said electrically insulating sheath material.

38. The fluid speed or direction measuring apparatus of claim 37, wherein said sheath material is synthetic resin.

* * * * *

UNITED STATES PATENT AND TRADEMARK OFFICE
CERTIFICATE OF CORRECTION

PATENT NO. : 4,856,330
DATED : August 15, 1989
INVENTOR(S) : HONDA et al

It is certified that error appears in the above-identified patent and that said Letters Patent is hereby corrected as shown below:

On the cover page, Item [30], "61-22562" should read --61-225626--.

Signed and Sealed this

Eighteenth Day of September, 1990

Attest:

HARRY F. MANBECK, JR.

Attesting Officer

Commissioner of Patents and Trademarks